United States Patent [19]

Urata et al.

[11] Patent Number: 5,450,151
[45] Date of Patent: Sep. 12, 1995

[54] DISPLAY DEVICE HAVING INDICATOR

[75] Inventors: Keishi Urata; Hiroyuki Tsuru, both of Tokyo, Japan

[73] Assignee: Nikon Corporation, Tokyo, Japan

[21] Appl. No.: 322,535

[22] Filed: Oct. 13, 1994

[30] Foreign Application Priority Data

Oct. 15, 1993 [JP] Japan ............... 5-055827 U

[51] Int. Cl.⁶ ............................................. G03B 17/00
[52] U.S. Cl. .................................................... 354/289.1
[58] Field of Search ........................... 354/289.1, 267.1

[56] References Cited

U.S. PATENT DOCUMENTS

| | | |
|---|---|---|
| 4,168,898 | 9/1979 | Orban . |
| 4,710,008 | 12/1987 | Tosaka et al. . |
| 4,849,783 | 7/1989 | Kiyohara et al. . |
| 4,933,697 | 6/1990 | Kawamura et al. . |
| 5,005,033 | 4/1991 | Miyasaka . |
| 5,283,606 | 2/1994 | Konno et al. . |

*Primary Examiner*—Monroe H. Hayes

[57] ABSTRACT

A display device has a display having a scale plate and an indicator movable on the scale plate, an instruction unit for releasing an instruction signal for moving the indicator, and a drive unit for moving the indicator based on the instruction signal. The device also has a detector for detecting whether the indicator is in movement or not. When the detector detects that the indicator is in movement, the movement of the indicator by another new instruction signal, eventually released from the instruction unit, is inhibited. Such movement of the indicator by another new instruction signal is permitted only when the detector detects that the indicator is not in movement.

3 Claims, 6 Drawing Sheets

DISPLAY DEVICE HAVING INDICATOR

BACKGROUND OF THE INVENTION

1. Field of the Invention

The present invention relates to a display device, and more particularly to a display device having an indicator adapted for use in a portable equipment such as a camera.

2. Related Background Art

For use as a display device for example in a camera, there has been conceived a device having an indicating hand or pointer (hereinafter called indicator), for indicating phototaking information such as the shutter speed, diaphragm stop or exposure correction value. In such display device, in response to an instruction signal supplied to control means such as a microcomputer, corresponding to the amount of operation of an operation member such as an externally operable dial of the camera, the indicator is moved by a predetermined amount to externally display the desired phototaking information.

In such display device, the stopped position of the indicator is always taken as the reference position, and the indicator is moved from said reference position, by an amount corresponding to the number of pulses of the instruction signal. Consequently, the reference position of the indicator naturally cannot be determined during the movement thereof, and, if a new instruction signal is supplied in such state, the amount of movement of the indicator cannot be determined. In such case, therefore, it is no longer possible to exactly display the phototaking information, and there may even result an erroneous operation of the indicator. Such drawback, resulting from a fact that the indicator is moved on real time basis by the input instruction signal, may be avoided by temporary storage of the instruction signal in a memory, but the use of an additional memory for such purpose will lead to an increased cost.

Also when the user moves the indicator, he rotates the command dial by a predetermined amount in order to move the indicator to a target position. If the movement of the indicator is slow, the indicator is still moving when the rotation of the command dial by the predetermined amount is completed. Therefore, the user is tempted to further rotate the command dial, in order to accelerate the movement of the indicator to the target position. As a result, there is encountered a drawback that the indicator eventually stops at a position beyond the target position, though the user terminates the rotation of the command dial when the indicator reaches the target position.

SUMMARY OF THE INVENTION

In consideration of the foregoing, the object of the present invention is to provide a display device having an indicator, capable of always exactly displaying the desired information, without the erroneous function of the indicator and also without the above-mentioned drawback in the operation of the user.

The above-mentioned object can be attained, according to the present invention, by a display device comprising display means including a scale plate and an indicator movable on said scale plate, instruction means for releasing an instruction signal for moving the indicator, movement means for moving the indicator based on the instruction signal released by the instruction means, detection means for detecting whether the indicator is in movement, and control means for inhibiting, when the detection means detects that the indicator is in movement, the movement of the indicator by another instruction signal which may be released from the instruction means, and enabling the movement of the indicator by another instruction signal when the detection means detects that the indicator is not in movement.

Thus, according to the present invention, when the indicator is detected to be in movement, the movement of the indicator by a new instruction signal is totally inhibited even if such new instruction signal is supplied, and the movement of the indicator by such new instruction signal is permitted only when the termination of movement of the indicator is detected.

DETAILED DESCRIPTION OF THE PREFERRED EMBODIMENTS

Now an embodiment of the present invention will be explained in detail, with reference to the attached drawings.

In the following description, a camera will be explained as the equipment to incorporate the display device with indicator of the present invention, but the present invention is applicable to any equipment that can utilize such display device.

Figure 1:
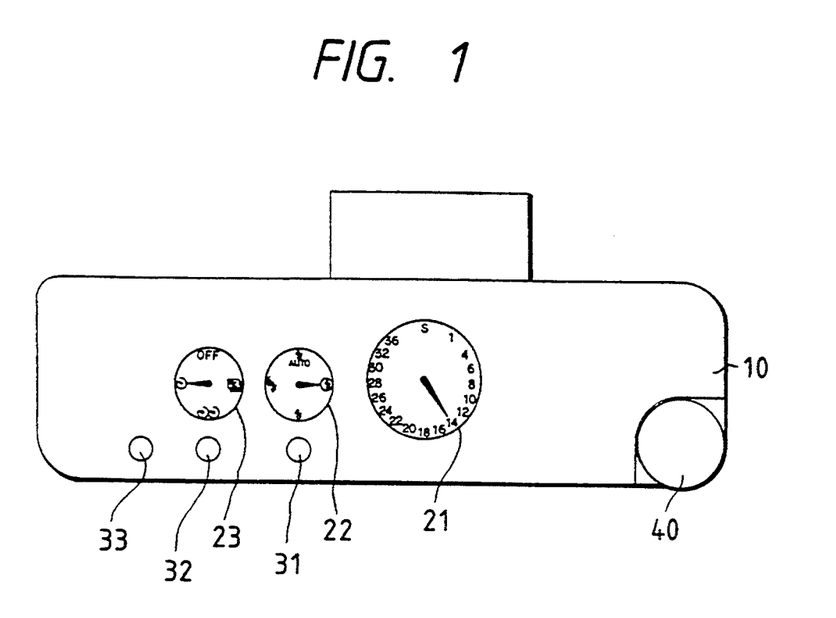
FIG. 1 is a plan view of a camera equipped with a display device with an indicator, embodying the present invention.

FIG. 1 is a plan view of a camera equipped with the display device with indicator, embodying the present invention, wherein display devices 21, 22, 23 are provided on the upper face of a camera body 10. The display device 21 indicates the number of film frames already exposed, while the display device 22 indicates the flash mode, and the display device 23 indicates the mode of a self-timer. In the vicinity of the display devices 22, 23 there are provided operation buttons 31, 32 and a resetting button 33. Also a rotationally operable command dial 40 is provided at the right-hand side on the upper face of the camera body 1.

Figure 2:
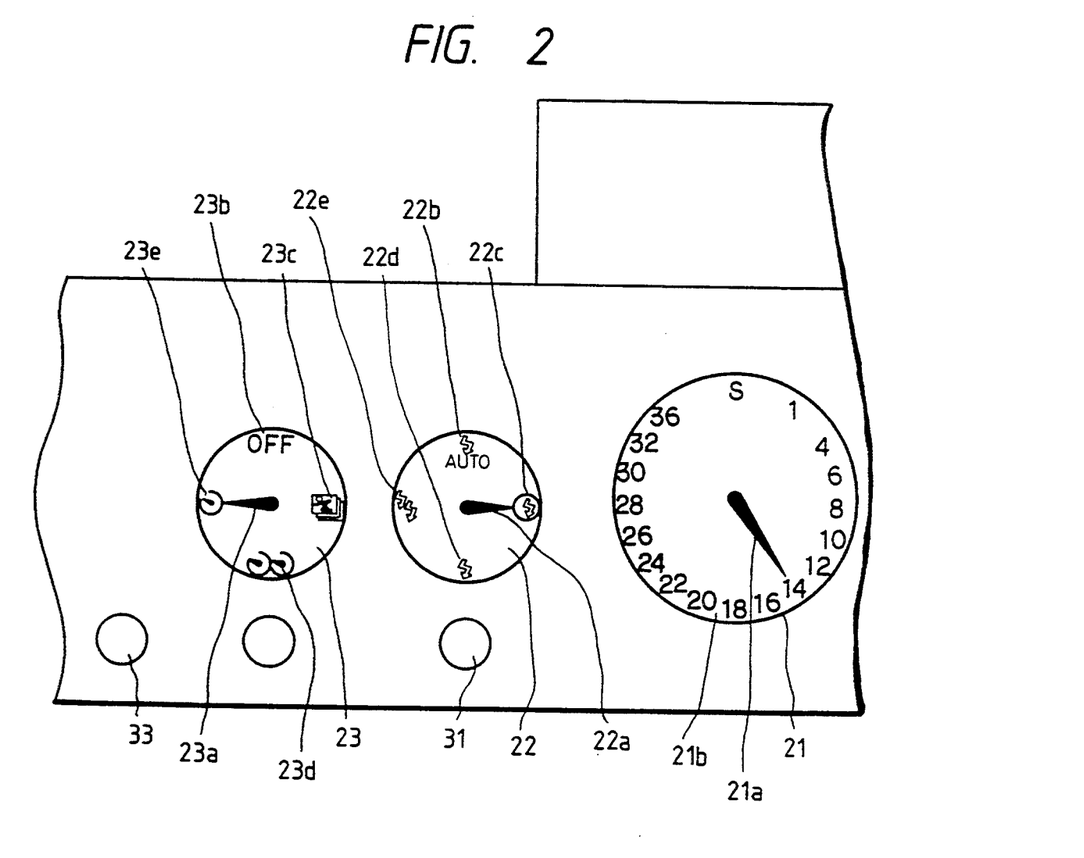
FIG. 2 is a magnified view of the display device having the indicator, shown in FIG. 1.

FIG. 2 is a magnified view of the upper face of the camera shown in FIG. 1. The display device 21 is provided with an indicator 21a, and a frame number scale 21b for indicating the frame number by the indicator 21a, and said indicator 21a is moved by an unrepresented stepping motor, in linkage with the film advancement. The frame number scale 21b consists of characters "1" to "36" and "S", and, for example, after the phototaking operation of the first film frame, the indicator 21a indicates "1". Also when the film cartridge is taken out from the camera, the indicator 21a indicates "S". Amount of such rotary motion of the indicator 21a is controlled by a CPU 50 shown in FIG. 3.

In said display device 21, the indicator 21a can clockwise or anticlockwise move within a range from a position "S" on the frame number scale 21b clockwise to a position "36", but cannot further rotate clockwise from said position "36" nor anticlockwise from said position "36".

The display device 22 is provided with an indicator 22a and a flash mode marks 22b–22e for indicating the flash modes with said indicator 22a, and said indicator 22a is moved by an unrepresented stepping motor. The flash mode mark 22b consists of a word "AUTO" and a symbol, indicating automatic flash function; the flash mode mark 22c consists of a symbol indicating the inhibition of flash function; the flash mode mark 22d consists of a symbol indicating the forced flash function; and the flash mode mark 22e consists of a symbol indicating flash pre-emission for alleviating so-called "red-'eye" phenomenon. In the state illustrated in FIG. 2, the indicator 22a indicates the inhibition of flash function.

In said display device 22, the indicator 22a can clockwise or anticlockwise move within a range from a position of the mark 22b clockwise to a position of the mark 22e, but cannot further rotate clockwise beyond said position of the mark 22e nor anticlockwise beyond said position of the mark 22b.

The display device 23 is provided with an indicator 23a and self-timer mode marks 23b–23e for indicating the self-timer modes with said indicator 23a, and said indicator 23a is moved by an unrepresented stepping motor. The self-timer mode mark 23b consists of a word "OFF" and a symbol, indicating that the self-timer modes are not used; the mark 23c consists of a symbol indicating continuous phototakings; the mark 23d consists of a symbol indicating a double self-timer mode; and the mark 23e consists of a symbol indicating a single self-timer mode. In the state illustrated in FIG. 2, the indicator 23a indicates the single self-timer mode.

In said display device 23, the indicator 23a can clockwise or anticlockwise move within a range from a position of the mark 23b clockwise to a position of the mark 23e, but cannot further rotate clockwise beyond said position of the mark 23e nor anticlockwise beyond said position of the mark 23b.

The indicator 22a rotates if the command dial 40 is rotated manually while the operation button 31 is depressed, and the indicator 23a rotates if the command dial 40 is rotated manually while the operation button 32 is depressed. Also if the resetting button 33 is depressed, the indicator 22a rotates to the position of the mark 22b, and the indicator 23a rotates to the position of the mark 23b. The rotating directions of these indicators are also controlled by the CPU 50 shown in FIG. 3.

Figure 3:
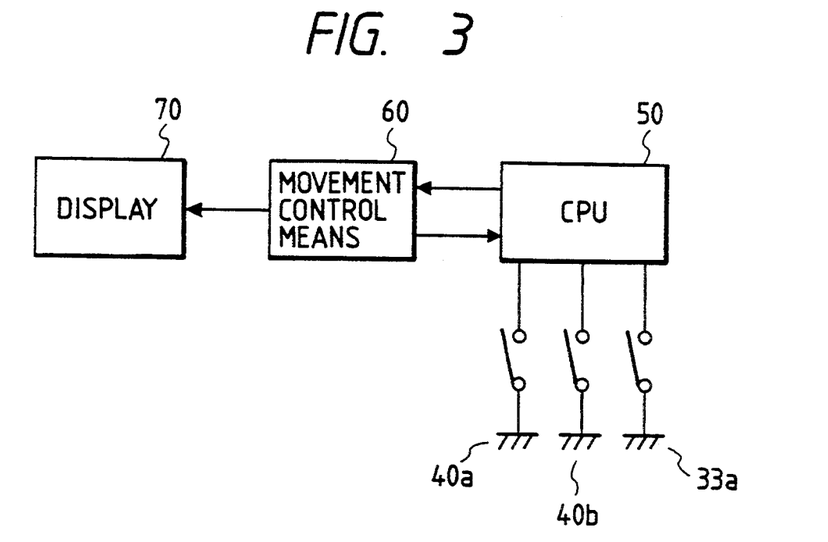
FIG. 3 is a block diagram of the display device having the indicator of the above-mentioned embodiment.

FIG. 3 is a block diagram of the display device with indicator of the present embodiment.

Command switches 40a, 40b are provided for releasing command signals for determining the moving direction and the moving amount of the indicator, and are turned on and off by the rotation of the command dial 40. More specifically, the command switch 40a is turned on by an anticlockwise rotation, in FIG. 1, of the command dial 40, while the command dial 40b is turned on by a clockwise rotation, in FIG. 1, of the command dial 40.

The command signals released when these command switches 40a, 40b are turned on are in the form of pulse signals, and the amount of movement of the indicator per pulse is determined in advance. For example, four flash modes or four self-timer modes are selectable in the present embodiment, so that a rotation angle of 90° is assigned to the indicator per pulse signal. The indicator is so constructed that, after it is moved by an amount corresponding to the number of pulses of the command signals released by the command switches 40a, 40b, it is stopped without further movement.

Simultaneous with the release of the command signals, there is activated an unrepresented timer circuit, which is used for the control for handling previously released pulses as a single command signal, when the continuous pulses are interrupted by a predetermined interval. Consequently the pulses released after said predetermined interval are handled as a next command signal.

A resetting command switch 33a is turned on by the actuation of the resetting button 33, thereby sending a reset signal to the CPU 50 to forcedly move the indicator to a predetermined initial position. In the present embodiment, in response to the actuation of the resetting button 33, the indicator 22a so rotates as to indicate the mark 22b, and the indicator 23a so rotates as to indicate the mark 23b. If the indicator 22a or 23a is in a state not indicating the mark 22b or 23b respectively, it starts anticlockwise rotation in response to the reset signal. When the indicators 22a, 23a rotate to the positions indicating the marks 22b, 23b, there is released a reset completion signal, in response to which the CPU 50 recognizes the completion of rotation of the indicators 22a, 23a to the respective initial positions.

Then, in response to a command signal generated by the closing of the command switch 40a or 40b, the CPU 50 supplies movement control means (a CPU for driving the stepping motor and the indicator) 60 with an instruction signal, which is to determine the moving direction of the indicator and to move the indicator by an amount corresponding to the number of pulses of the command signal. In response to said instruction signal, the movement control means 60 sends a movement control signal to the display device 70, which, in response to said movement control signal, initiates the movement of the indicator.

The indicator driving CPU of the movement control means 60 releases, together with the movement control signal supplied to the display device 70, a movement state (start) (high) signal, indicating the start of movement of the indicator, to the CPU 50. When the indicator is stopped after the movement of a predetermined amount, the movement means 50 sends a movement state (end) (low) signal to the CPU 50. In this manner the indicator driving CPU of the movement control means 60 supplies the CPU 50 with signals corresponding to the movement state of the indicator, whereby the CPU 50 can constantly recognize whether the indicator is in the course of movement or is stopped after the movement of the predetermined amount.

Figure 4:
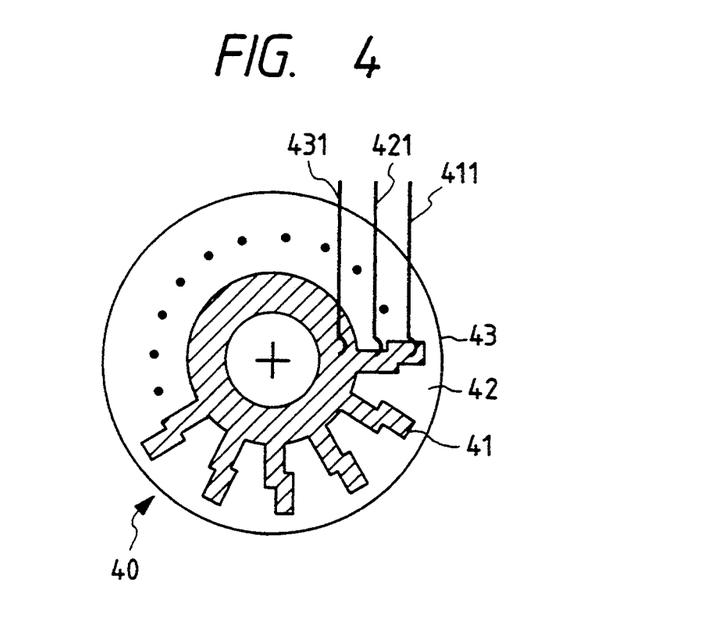
FIG. 4 is a view of a command dial 40, seen from the bottom side, of the display device, having the indicator, of the above-mentioned embodiment.

In the following there will be explained in details how the command signal is released by the rotational operation of the command dial 40. FIG. 4 illustrates the command dial 40, seen from the bottom side.

On the rear face of the command dial 40, as shown in FIG. 4, there is formed a radial conductive pattern 41, extending from the central portion to the peripheral portion. Three brushes 411, 421, 431 are provided for sliding on said conductive pattern 41, in combination with the rotation of the command dial 40. Said conductive pattern 41 has a stepped form in the rotating direction, in such a manner that, when the command dial 40 is rotated for example anticlockwise in FIG. 4, the sliding brush 411 comes into contact with the conductive pattern 41 earlier than another brush 421. Consequently the rotating direction of the command dial 40 can be identified according to whether the sliding brush 411 or 421 first comes into contact with the conductive pattern 41 in the rotary motion of the command dial 40.

Figure 5A:
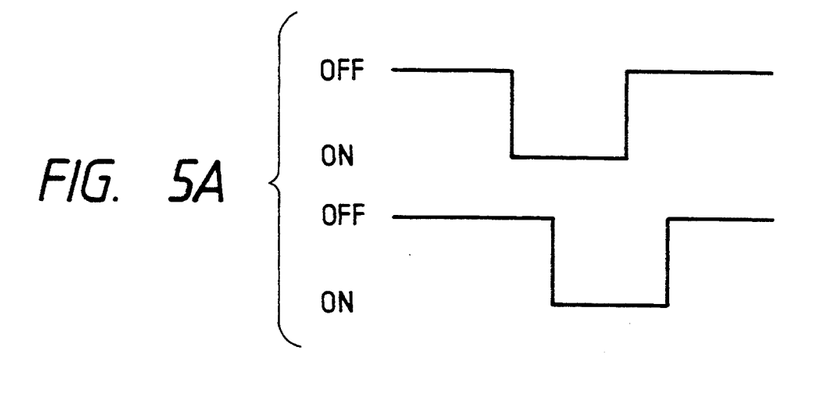
FIGS. 5A and 5B are conductive timing charts of sliding brushes 411, 421 and a conductive pattern 41 of the display device, having the indicator, of the above-mentioned embodiment.
Figure 5B:
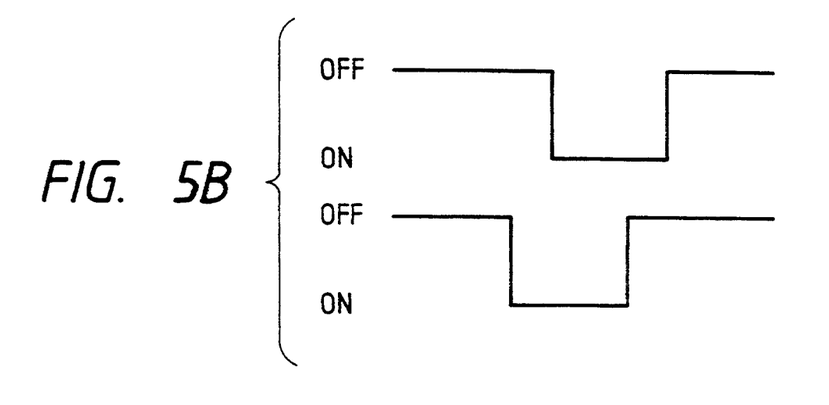

FIGS. 5A and 5B are timing charts showing the conduction between the sliding brushes 411, 421 and the conductive pattern 40. In these charts, the upper curves indicate the timing of conduction of the sliding brush 411, while the lower curves indicate the timing of conduction of the sliding brush 421. In FIG. 5A, the sliding brush 411 becomes conductive earlier than the brush 421, whereby it is identified that the command dial 40 is rotated anticlockwise in FIG. 4, namely clockwise in FIG. 1. Likewise, in case of FIG. 5B, the sliding brush 421 becomes conductive earlier than the brush 411, whereby it is identified that the command dial 40 is rotated anticlockwise in FIG. 1.

Figure 6:
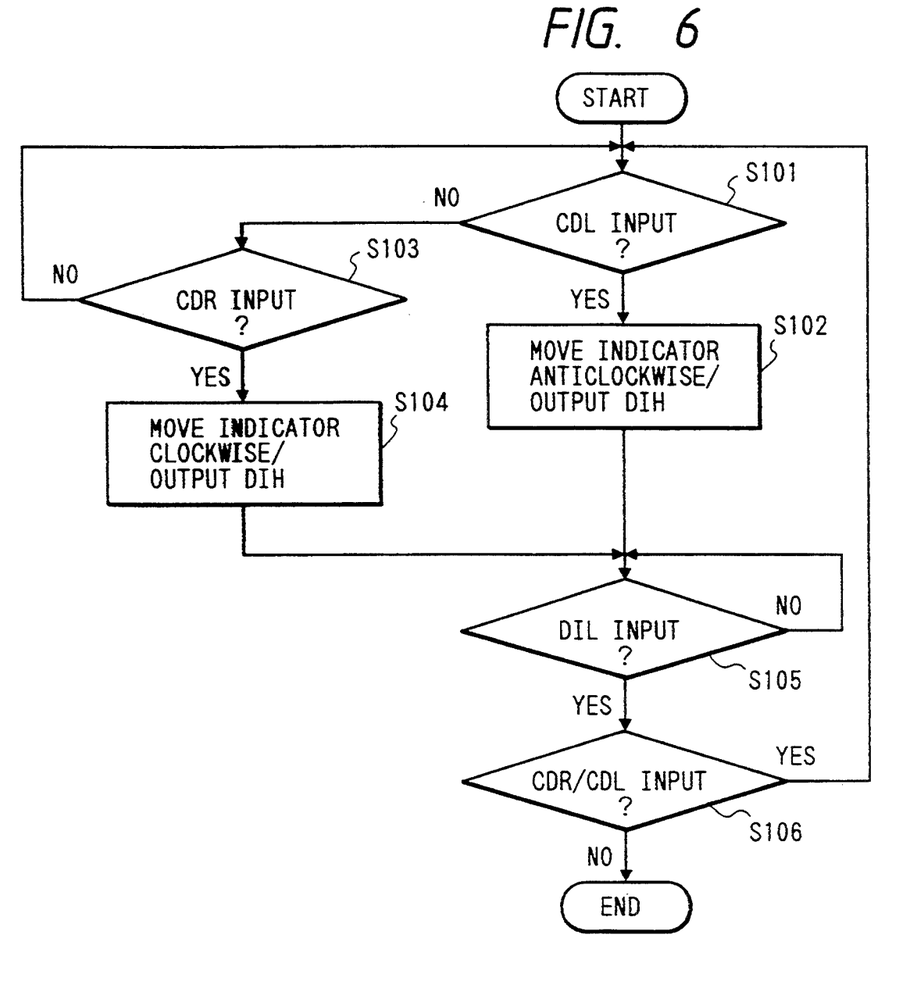
FIGS. 6 and 7 are flow charts showing control sequences of a CPU 50 of the display device, having the indicator, of the above-mentioned embodiment.

In the following there will be explained the function of the display device with indicator of the above-explained configuration with reference to a flow chart in FIG. 6, which shows the control sequence of the CPU 50 in this embodiment.

This sequence is activated when the main power supply of the camera is turned on. This flow chart only explains the function of the CPU 50 for controlling the display device 22, although two display devices 22, 23 are provided in this embodiment for indicating the flash modes and the self-timer modes. (step S101)

At first this step S101 discriminates whether a command signal (CDL signal) for moving the indicator 22a clockwise in FIG. 1 has been supplied to the CPU 50, from the difference in timing of the conductive state between the conductive pattern 41 and the sliding brushes 411, 421, resulting from the rotary motion of the command dial 40. If said signal has been supplied, the sequence proceeds to a next step S102, but, if not supplied, the sequence proceeds to a step S103. (step S102)

In this step S102, in response to the CDL signal entered in the step S101, the CPU 50 supplies the drive means 60 with a control signal, and receives, from said drive means 60, a movement signal, indicating that the indicator 22a has started the rotating movement. (step S103)

On the other hand, if the discrimination in the step S101 shows a negative result, indicating that the CDL signal has not been released, this step S103 discriminates whether a command signal (CDR signal) for moving the indicator 22a anticlockwise in FIG. 1 has been supplied to the CPU 50. In case of an affirmative result, the sequence proceeds to a next step S104, but, in case of a negative result, the sequence returns to the step S101.

Absence of the affirmative result indicates that the command dial 40 has not been rotated. (step S104)

In this step S104, in response to the CDR signal entered in the step S103, the CPU 50 supplies the drive means 60 with a control signal, and receives, from said drive means 60, a movement signal, indicating that the indicator 22a has started the rotating movement. (step S105)

This step S105 discriminates whether a stop signal from the drive means 60 has been entered to the CPU 50. Said stop signal means that the indicator 22a has been stopped after the rotary movement of a predetermined amount. If the stop signal is identified to have been supplied to the CPU 50, the sequence proceeds to a step S106.

On the other hand, if it is identified that the stop signal has not been supplied to the CPU 50 or that the indicator 22a is in the course of movement, this step S105 is repeated until said stop signal is supplied to the CPU 50. (step S106)

This step S106 discriminates-whether a new command signal, by the rotational operation of the command dial 40, has been supplied to the CPU 50. If a new instruction signal has been supplied to the CPU 50, the sequence returns to the step S101. On the other hand, if the new command signal has not been supplied to the CPU 50, this flow is terminated.

According to this flow chart, as explained in the foregoing, the movement of the indicator 22a by a new command signal is entirely inhibited while the CPU 50 receives a movement signal from the drive means 60, namely during a clockwise or anticlockwise movement of the indicator 22a. Stated otherwise, during a period from the release of the control signal from the CPU 50 to the drive means 60 in the step S102 or S104 to the entry of the stop signal in the step S105, the movement of the indicator 22a by a new command signal is entirely inhibited.

Then, only after the entry of the stop signal to the CPU 50 in the step S105, there is permitted the entry of a new command signal in the step S106. In the display device with indicator of the above-explained flow chart, the movement of the indicator 22a based on a command signal is started after said indicator is completely stopped. Consequently it is possible to always exactly determine the reference position of the indicator, and to prevent the erroneous function thereof. Furthermore it is not necessary to store the instruction signal for example in the memory.

In the above-explained embodiment, the moving state of the indicator is detected by the entry of the movement signal from the drive means 60 to the CPU 50.

In the foregoing flow chart there has been explained the movement of the indicator based on the rotational operation of the command dial 40. In the following there will be explained the movement of the indicator 22a, in response to the depression of the resetting button 33.

Figure 7:
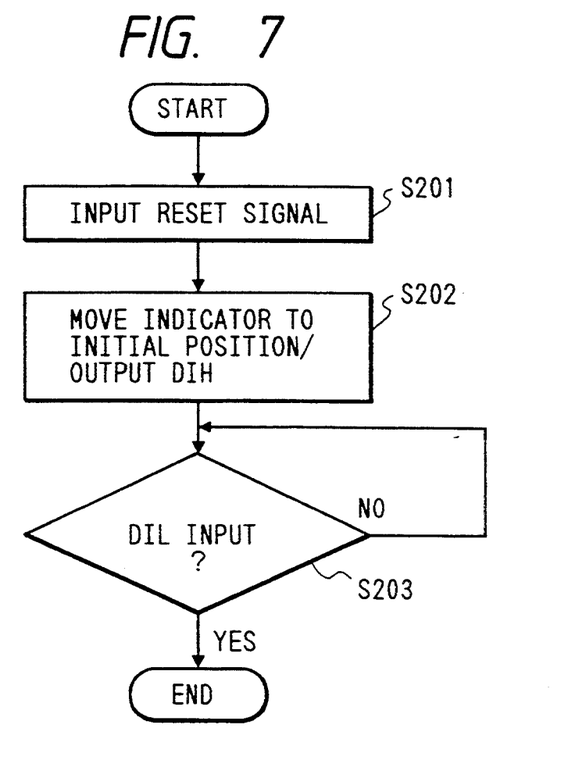

FIG. 7 is a flow chart showing the control sequence of the CPU 50 in case the reset button 33 is depressed.

This flow is activated by the closing of the reset switch 33a, caused by the depression of the reset button 33, namely by the entry of a reset signal to the CPU 50. The CPU 50 can accept such closing of the reset swtich 33a any time, as long as the CPU 50 is rendered operable by the power supply to the camera. (step S201)

At first, in this step S201, the CPU 50 receives the reset signal. (step S202)

In this step S202, the CPU 50 supplies the drive means 60 with a reset control signal, and receives, from said drive means 60, a reset movement signal, indicating that the indicator 22a has started the movement to the reset position (in this embodiment, position AUTO of the display device 22). (step S203)

This step S203 discriminates whether a reset completion signal from the drive means 60 has been supplied to the CPU 50. If the reset completion signal has not been supplied, namely if the indicator is in the course of resetting operation, this step S204 is repeated until the reset completion signal is released.

On the other hand, if the reset completion signal has been supplied to the CPU 50, the operations of this flow chart are terminated.

The closing of the reset switch 33a, for moving the indicator in response to the depression of the reset button 33, is always accepted as long as the camera is powered and rendered operable, even while the indicator is in movement. This is made possible because the reset position of the indicator is predetermined, so that the movement of the indicator to the reset position is not influenced even if the reference position cannot be determined.

However, a new movement of the indicator based on the rotational operation of the command dial 40 is inhibited during a period from the supply of the reset control signal from the CPU 50 to the drive means 60 in the step S202 to the entry of the reset completion signal in the step S203, namely during the resetting operation of the indicator 22a.

In the above-explained embodiment, the moving state of the indicator is detected by the supply of the reset control signal from the CPU 50 to the drive means 60.

According to the present invention, as explained in the foregoing, when detection means detects the moving state of the indicator, there is inhibited the movement of the indicator by another new instruction signal eventually released from the instruction means, and such movement of the indicator by another new instruction signal is permitted only when the detection means detects that the indicator is not in movement. Consequently the indicator is moved only after the reference position thereof is defined, so that it is rendered possible to securely recognize the moving amount of the indicator and to prevent erroneous function of the indicator.

What is claimed is:

1. A display device with indicator, comprising:
   a display including a scale plate and an indicator movable on said scale plate;
   an instruction device for releasing an instruction signal for moving said indicator;
   a movement device for moving said indicator, based on the instruction signal released by said instruction device;
   a detection device for detecting whether said indicator is in movement; and
   a control device for inhibiting, when said detection device detects that said indicator is in movement, the movement of said indicator by another new instruction signal eventually released from said instruction device, and permitting the movement of said indicator by said another new instruction signal when said detection device detects that said indicator is not in movement.

2. A display device with indicator according to claim 1, further comprising a resetting device for moving said indicator to a predetermined initial position.

3. A display device with indicator according to claim 2, wherein said resetting device is adapted to forcedly move said indicator to a predetermined initial position, even when said detection device detects that said indicator is in movement.

* * * * *